Jan. 16, 1968  F. E. MANN  3,363,932
FOUR SLEEPER CAMPER
Filed Oct. 24, 1965  3 Sheets-Sheet 1

FRANK E. MANN
INVENTOR.

BY Wm. E. Ford
ATTORNEY

Jan. 16, 1968  F. E. MANN  3,363,932
FOUR SLEEPER CAMPER
Filed Oct. 24, 1965  3 Sheets-Sheet 2
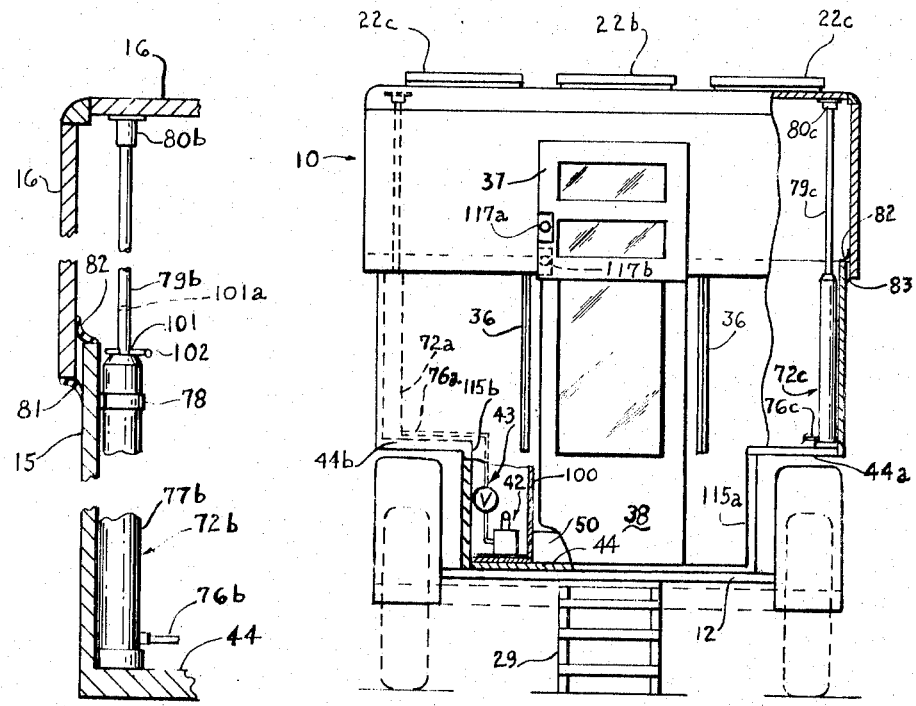
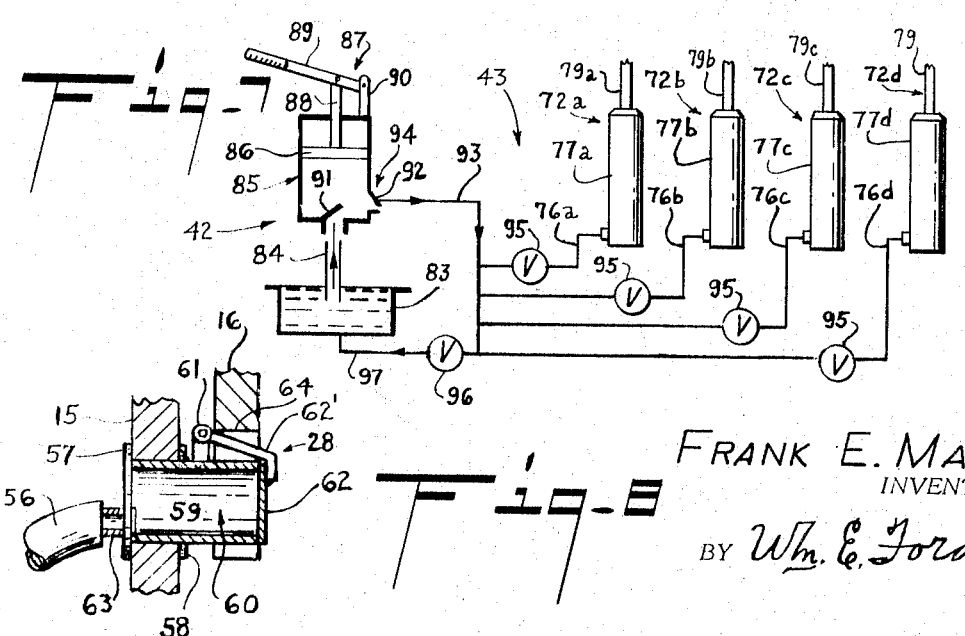
FRANK E. MANN
INVENTOR
BY Wm. E. Ford
ATTORNEY

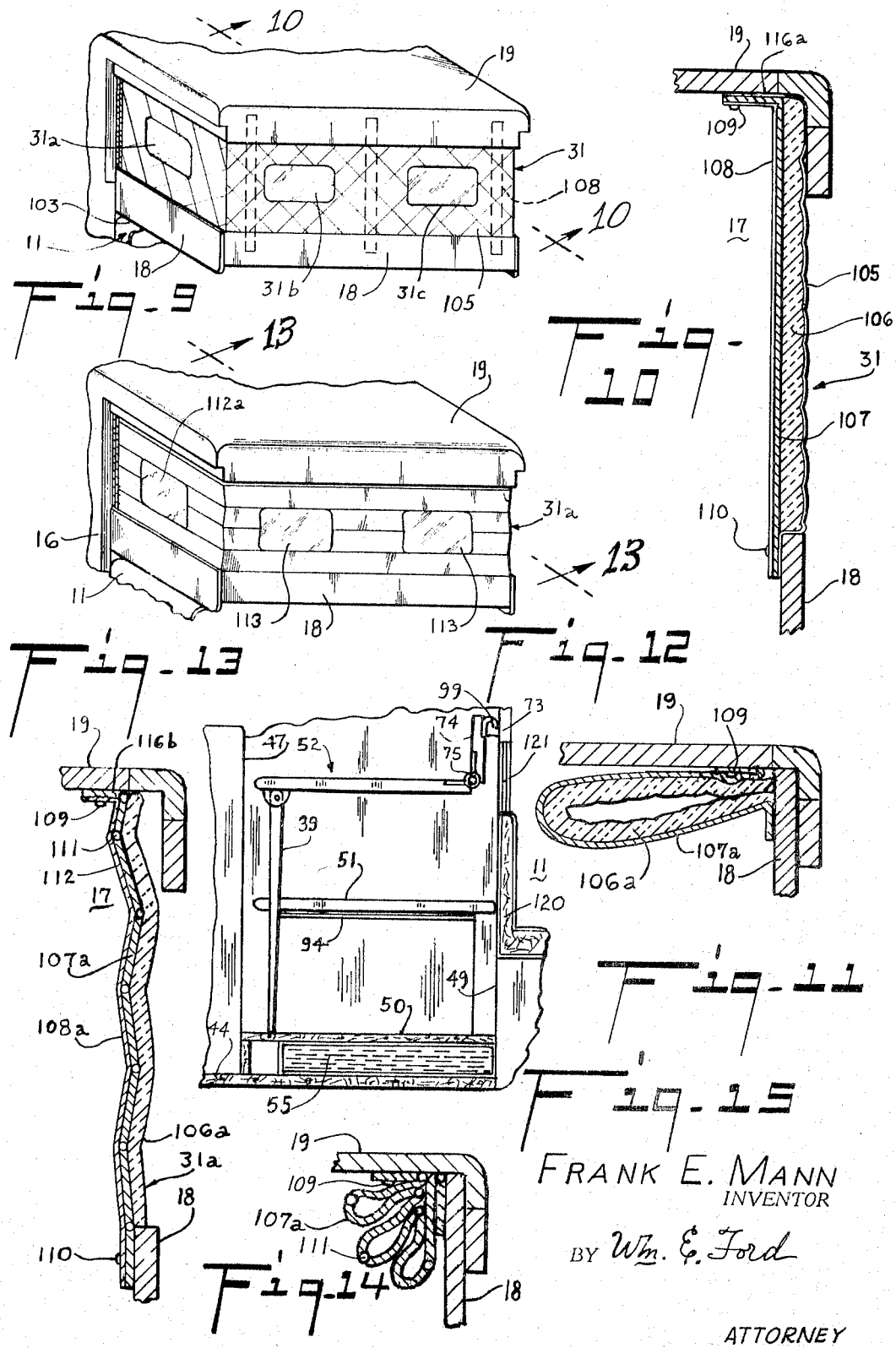

United States Patent Office 3,363,932
Patented Jan. 16, 1968

3,363,932
FOUR SLEEPER CAMPER
Frank E. Mann, 5430 W. 43rd St.,
Houston, Tex. 77018
Filed Oct. 24, 1965, Ser. No. 504,377
12 Claims. (Cl. 296—23)

ABSTRACT OF THE DISCLOSURE

The invention provides a four sleeper camper having a truck bed supported lower section wider than the driver's cab, and including a forward cantilever portion to extend over the driver's cab top; also included is an upper section with means to telescope it over the lower section and including a forward cantilever portion to extend immediately over the lower section cantilever portion. A means to telescope the sections can thus raise the upper section so that the opening between cantilever portions may be enclosed to comprise a forward two sleeper compartment. Transverse upper section members on each side telescope over lower section forward corners, and the driver's cab can thus serve as the lower section forward wall.

---

This invention relates to a four sleeper camper of the type which is carried on the bed of a truck with an upper section telescoped down upon a lower section when in transit; the upper section being raised hydraulically and latched when at camp, and the camper being removable, the camper including upper and lower forward portions cantilevered over the cab, with the forward portions being enclosed when the upper section is raised to complete a forward, two sleeper compartment.

It is a primary object of this invention to provide a four sleeper camper of this class which includes a lower section forward portion extending over the cab of a transporting truck and with an upper section forward portion disposed thereabove when raised, the portions being panelled to complete a forward two sleeper compartment.

It is also an object of this invention to provide a four sleeper camper of this class which includes hydraulic cylinder-piston arrangements symmetrically disposed with relation to the weight of the upper and lower sections of the camper whereby the upper sections may be raised or lowered by an easily accessible pump operation, and at a uniform rate.

It is another object of this invention to provide a four sleeper camper unit of this class in which the panels which enclose the forward compartment are accordioned automatically as the upper section is raised.

It is another object of this invention to provide a four sleeper camper unit of this class which enables the unit to be removed from the carrying vehicle, and disposed, as in a garage or other enclosure with predetermined headroom.

It is also another and further object of the invention to provide a four sleeper camper of this class, with upper section adapted to be lowered in transit, thereby reducing wind resistance and road sway as the center of gravity of the total mass in transit is thus lowered.

It is another and further object of this invention to provide a four sleeper camper of this class in which the lower section forward portion does not depend upon the car cab for support, and in which the upper section forward portion is cantilevered thereabove when the upper section is raised, the forward portions having panels disposed therebetween to complete a forward compartment.

It is yet another object of this invention to provide a four sleeper camper of this class in which the lower section provides a water compartment filled from the outside thereof, the inlet to the water compartment being latched in closed position when the upper section is in lowered position, preventing contamination of the water supply by car attendants.

It is also another and further object of this invention to provide a four sleeper camper unit of this class which may be raised and lowered by two or more symmetrically disposed hydraulic cylinder-piston units, or by any other symmetrically disposed elevating apparatus.

Other and further objects will be apparent when the specification hereinbelow is considered in connection with the drawings, in which:

FIG. 5 is an elevational view, part in section, and partially diagrammatic, taken from the rear of the camper shown with roof section raised in FIG. 2;

FIG. 6 is a fragmentary sectional elevational view looking forward at the forward, left corner jack shown in FIG. 3;

FIG. 7 is a diagrammatic view of the hydraulic fluid system for operating the hydraulic cylinder-pistons shown in FIGS. 3, 5 and 6;

FIG. 8 is a fragmentary sectional elevation taken looking forward at the water inlet shown to small scale in FIGS. 1 and 2;

FIG. 9 is a fragmentary, isometric, front, side and top view of one form of four sleeper camper forward compartment, as shown in FIG. 2;

FIG. 10 is an elevational sectional view taken along line 10—10 of FIG. 9 to show panel construction detail;

FIG. 11 is a fragmentary sectional elevation showing the panel shown in FIG. 10 as disposed when the upper section of the camper is lowered;

FIG. 12 is a fragmentary, isometric, front, side and top view of an alternative form of four sleeper camper forward compartment with panel construction differing from that shown in FIG. 2 and from that shown in FIGS. 9–11;

FIG. 13 is a fragmentary sectional elevation taken along line 13—13 of FIG. 12 showing panel detail;

FIG. 14 is a fragmentary sectional elevation, showing panel detail with the camper upper section lowered; and FIG. 15 is a fragmentray longitudinal sectional elevation taken along line 15—15 of FIG. 3.

Figure 1:
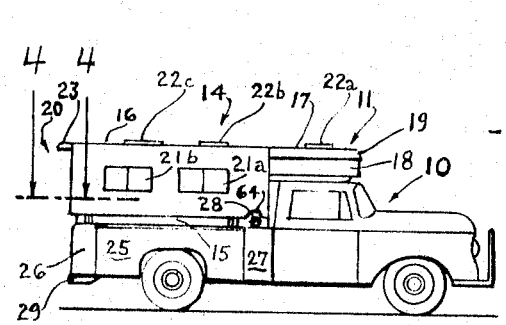
FIG. 1 is a small scale side elevation of a truck carrying a four sleeper camper which comprises an embodiment of this invention, the upper section of the camper being shown in lowered position.

Referring now to the drawings in which like reference numerals are assigned to like elements in the various views, a pick-up truck 10 is shown in FIG. 1 and includes a conventional cabin 11 and a truck bed 12. A camper 14 including a camper compartment 20 and a forward compartment 17, is shown supported upon the bed 12 and cabin 11, respectively. The camper 14 comprises a lower section 15, having its bottom rested upon the truck bed 12, and also includes an upper section 16 which is telescoped downwardly over the lower section 15 as will be hereinbelow described.

The forward compartment 17 is comprised of a lower section forward portion 18 and an upper section forward portion 19, which rests on top of the aforesaid portion 18, as shown in FIG. 1. The upper section 16 is disclosed in FIG. 1 as providing forward windows 21a and rearward windows 21b, and the camper also is shown as having a forward ventilator 22a over the forward compartment 17, and a central ventilator 22b and a rearward ventilator 22c over the camper compartment 20. Also, the upper section 16 provides a weather cowl 23 which overextends from its top to the rear.

The lower section 15 may be seen in FIG. 1 above the side 24 of the truck bed 12, and the side of the truck bed is extended outwardly to provide a tool or storage compartment 25 and to support a butane fuel bottle 26 to the rear of the storage compartment 25 and a container 27, for water or gasoline, forwardly thereof. Also, in FIG. 1, a water filling inlet 28 is shown extending outwardly from the lower section 15 through a recess provided in the upper section 16. Additionally, steps 29 are shown suspended below the rear of the camper 14.

Figure 2:
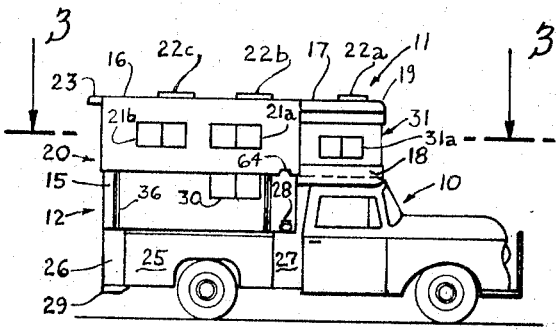
FIG. 2 is a small scale side elevation of the truck and four sleeper camper shown in FIG. 1, in which the upper section of the camper is shown in raised position.

In FIG. 2, the upper section 16 is shown in raised position and in this view a window 30 is visible under the upper section forward window 21a, such window 30 falling in coincidence with the window 21a when the upper section 16 is in lowered position. Also, when the upper section 16 raised, its forward portion 19 is disposed above the lower section forward portion 18 and a panel assembly 31 is interposed between the portions 18 and 19 to complete the forward compartment 17, the panel assembly 31 including side windows, as the right side window 31a shown in FIG. 2.

Figure 3:
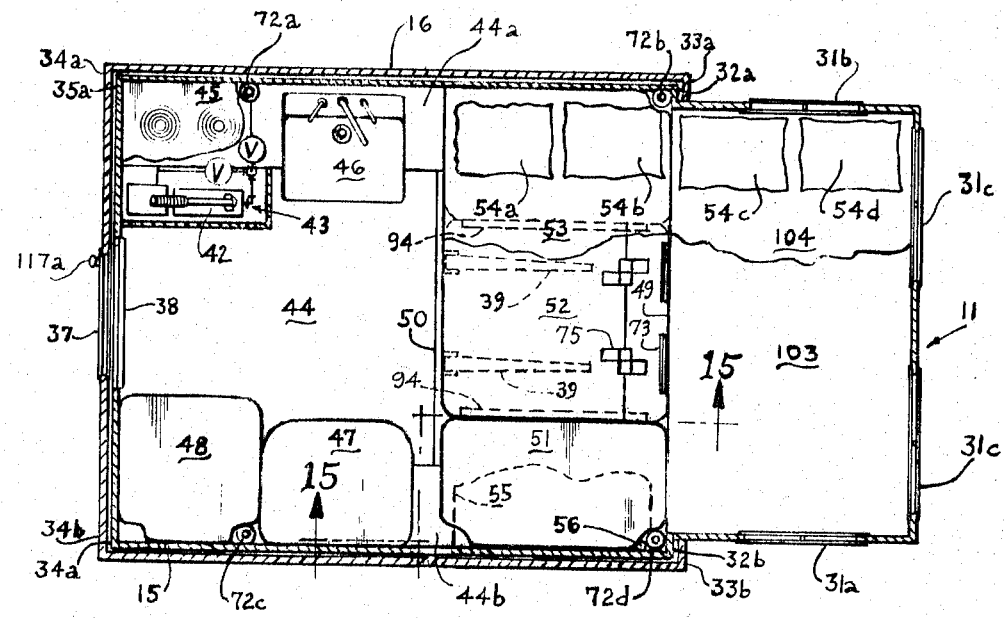
FIG. 3 is a sectional plan view, partially diagrammatic, taken along line 3—3 of FIG. 2, showing the general arrangement of the four sleeper camper equipment.

Referring now to FIG. 3, the upper section 16 is shown outwardly of the lower section 15, and telescoped thereover, with the lower section 15 being of greater width than its forward portion 18 thereby providing left and right forward corners 32a, 32b, over which may slide upper section forward lips or panels 33a, 33b when the upper section 16 is raised or lowered. At the same time upper section rear corners 34a, 34b slide with relation to lower section rear corners 35a, 35b. In this manner the upper section 16 is generally guidably disposed with relation to the lower section 15, and also guide strips 36, shown in the sectional plan view of FIG. 4, and indicated in small scale in FIGS. 1 and 2, and in elevation in FIG. 5, are spaced apart to extend vertically along the sides and back of the lower section 15 to guidably space the upper section 16 therefrom.

Figure 4:
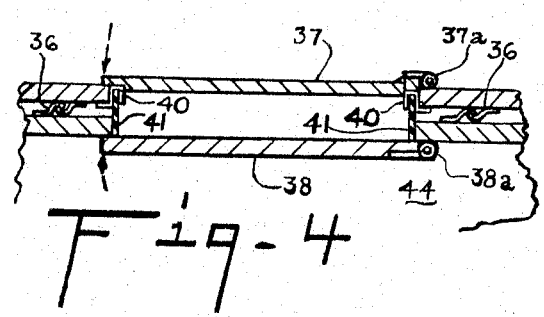
FIG. 4 is a fragmentary sectional plan view taken along line 4—4 of FIG. 1, showing rear door details.

As shown in FIGS. 3, 4 and 5, the upper section 16 provides an outer door 37 and the lower section 15 provides an inner door 38. When the upper section 16 is raised, the inner door 38 may be pushed inwardly to give admission into the camper interior.

As shown in detail in FIG. 4, the doors 37, 38 are in the positions occupied when the camper 14 is closed. In this case the inner door 38 has been swung outwardly, as indicated in dotted lines, from open position within the camper, on its hinges 38a, to close the opening into the inner section 15. Also, the outer door 37 has been swung inwardly on its hinges 37a to close the outer section 16.

As shown in detail cross-section in FIG. 4, the outer section 16 has guide channels 40 on the opposed inner faces of the door opening therein, and these guide channels 40 slide over seal strips 41 affixed to the opposed inner faces of the door opening in the inner section 15.

Referring again to FIG. 3, the arrangement of equipment in the camper rear compartment 20 is shown, in part, diagrammatically and includes to the left rear, a pump 42 based on the lower section floor 44, and its hydraulic fluid system 43, all to be described in detail hereinbelow. A stove 45, as one which cooks with butane gas, is supported from the lower section floor 44 and above the pump system 42, 43. Also, forward of the stove 45 a sink 46 is provided on the left side, and oppositely of the sink 46, on the right side, a refrigerator 47 is provided, and to the rear of the refrigerator 47, there is provided a conventional collapsible rubber bag toilet 48.

A support base 50, serving partly for storage, is built up above the camper compartment floor 44, and spaced above the base on each side a built-in seat is provided, as the seat 51 shown on the right side in FIG. 3. Also, a table 52 is disposed above the base 50 at the forward part of the camper comparement 20, centrally between the seats.

In raised position the table 52 is supported to the rear by two legs, one under each rear corner. Such a leg is indicated diagrammatically in FIG. 3 as the leg 39, hingedly moved outwardly to upstand above the base 50. On the forward side of the table 52 two horizontally spaced apart, horizontally extending latch bars 73, of L-shape in cross-section, are mounted on the rear wall 49 of the vehicle cabin 11.

In the raised position of the table 52, as shown in FIG. 15, the forward section 74 of the table top, which is connected to the main part of the table 52 by hinges 75, has latch members 99 which engage in the latch bars 73 whereby the legs 39, in lowered position, support the table under the rear part thereof. The table 52 is thus supported with its top surface at a level to be used as a table, and consequently the seats 51 hold proper position, on each side, as seats.

It may be visualized by a consideration of FIG. 3 that room is provided for one to pass between the rear corners of the table 52 and the respective basin 46 on the left and refrigerator 47 on the right to have access to the respective seats 51. When the table 52 and the two seats 51 are to be used as a bedstead or support for the rear two-sleeper unit 53, the conventional table legs 39 are pivoted upwardly and conventionally latched underneath the table, while the latch members 99 are removed from engagement with the respective latch bars 73, and the forward table section 74 pivoted downwardly to the level of the main part of the table top, the whole table top thereby being positioned at the level of the seats 51 and in sliding edge to edge abutment therewith, as the outer ends of the table top, to right and left, are supported by conventional support ledges 94 carried by the inner faces of the seats 51 at a distance below the top of seat equal to the thickness of the table top. When the table top has been put in place between the seats, a bed of double width may be made up over the table and two seats, as indicated by the pillows 54a, 54b in FIG. 3.

A consideration of FIG. 15 indicates that, forward of the table 52, the driver's or passenger's seat 120 forms part of the rear wall 49 of the cabin 11, and above the top of the seat 120, a sliding window 121 is provided, so that communication and a degree of access can be had, as to pass items back and forth, the access being easier when the table is in lower position, but access also available between the cabin to one seated when the table is in upper position.

As indicated in dotted lines in FIG. 3, a fresh water compartment 55 is shown as part of the space provided by the base 50, and the water inlet 28, shown to small scale in FIGS. 1 and 2, admits water through the wall of the lower section 15, to pass by way of a flexible conduit 56, to fill such compartment 55, as with fresh water for drinking and cooking purposes.

As shown in detail in FIG. 8, the water inlet 28 into the lower section 15 includes a cup 60 passed through the lower section wall, the cup 60 having an inner closure plate 57 which bears against the lower section inner face, while a retaining ring 58 is slidable over the outer end of the cup 60 to be attached to the cup and to bear on the outer face of the lower section 15, thereby affixing the cup in position. A nipple 63 extends from within the cup 60 through the inner closure plate 57 and has the aforesaid flexible conduit 56 connected thereto.

The inlet 28 also includes a post 59 which upstands from the top of the cup 60 to mount a hinge 61 having a lid member 62' included thereby to the outer end of which is connected a lid 62 which extends downwardly to close the outer end of the cap 60. The upper section 16 of the camper has a recess or slot 64 upwardly through the lower edge thereof near the right forward corner through which the cup 60 of the water inlet 28 extends outwardly from the lower section 15, whereby, when the upper section is lowered, the upper surface of this slot bears against the lid member 62' to lock the water inlet in closed position so that the fresh water compartment cannot be contaminated, such as by gasoline being injected through error by a service operator in servicing the truck with fuel.

The cylinder-piston unit 72b is shown in FIG. 6 having the hydraulic fluid inlet 76b into the lower end of the cylinder 77b which is based upon the floor 50 of the lower section 15. Thereabove the cylinder 77b is shown clamped to the lower section sidewall by a clamp 78 and a piston rod 79b (from a piston, not shown, but disposed within the cylinder 77b, near the top thereof), extends upwardly and is connected into a connection flange 80b which is affixed to the underside of the top of the upper section 16. A seal strip 81 is shown diagrammatically in FIG. 6 as a seal means affixed to the lower face of the upper section 16 and slidable along the outer face of the lower section 15 while a similar seal strip 82 is affixed to the upper face of the lower section 15 so that the inner face of the upper section 16 slides with relation thereto.

As shown diagrammatically in FIG. 7, a hydraulic fluid system for the cylinder-piston units comprises hydraulic fluid reservoir 83 which is connected by a conduit 84 to a pump cylinder 85 having a piston 86 of a lift system 87 slidable therewithin. The rod 88 from the piston 86 extends sealably through the upper end of the cylinder 85 and is connected to a pump handle 89 which is pivotally connected at one end to a post 90 which upstands from the top of the lift cylinder 85. A flapper valve 91 controls the upper end of the lift conduit 84 and a flapper valve 92 controls the discharge from the lift cylinder 85. Thus a conventional discharge conduit 93 extends from the outlet 94 from the lift cylinder 85, and branch lines 76a and 76b, 76c and 76d extend from the conduit 93 to respective cylinders 77a, 77b, 77c and 77d of the hydraulic jacks or cylinder-piston units 72a, 72b, 72c and 72d. Conventional manually controlled valves 95 are provided in each of the conduits 76a, 76b, 76c and 76d, such valves, as adjusted, allowing the pressure to each jack to be regulated according to the distribution of the roof load, and to let the fluid drain back out of the cylinders to the reservoir 83 when a master valve 96 and a return line 97 to the reservoir 83 are opened.

When it is desired to raise the upper or roof section 16, the respective doors 37 and 38 are opened and an operator then has access to open the enclosing cabinet 100 and thus gain access to the pump jack handle 89 and to close the valve 96 whereby up and down movement of the handle 89 raises the jacks or piston rods 79a, 79b, 79c and 79d. Each corner is thereby raised simultaneously and at substantially the same rate by virtue of the substantially equal opposition opposed by each corner to the respective force which lifts it.

Also, the various hydraulic fluid passages and pressure to be exerted on each jack may be calibrated by valves 93 so that each jack is lifted with uniformity. When the roof section 16 has been lifted to predetermined elevation, holes 101 in the respective piston rods 79a, 79b, 79c and 79d clear the top of the respective cylinders 77a, 77b, 77c, 77d so that latch pins 102 as shown in FIG. 6 may be inserted through such holes 102 whereby the rigid tops of the cylinders then support the roof section and the fluid system is relieved of this duty by opening the valve 96 to release the pressure of the fluid which has lifted the jacks. Then the door of the compartment 100 may be closed to conceal and protect the lift system.

As may be seen in FIG. 3, the jacks 72a, 72b, 72c, 72d may be disposed by convenience upon the floor 44 of the compartment, and as long as the disposition of the jacks is such as to substantially balance the load of the roof section, it does not make any difference exactly how many jacks are to be employed nor do they have to be located in the corners of the lower section. For instance, the forward jacks 72b, 72d, shown located in the forward corners in FIG. 3, may as well be disposed centrally at the head of the bed 53 or even further to the rear as long as each jack is lifting its proportionate share of the roof load.

Also, the roof section 16 may be supported by three point suspension, if desired, as indicated by a jack 72e shown in phantom lines just to the rear of the cabin rear wall 74. In this manner the forward corner areas, or the left and right forward outer portions of the camper compartment 20, might thus be left free for other equipment.

The cantilevered forward portion 18 of the lower section 15 supports the forward two sleeper unit 104 as indicated by the two pillows 54c and 54d in FIG. 3. When the roof section 16 is raised, the forward portion 19, which is integral therewith, is also raised to provide ample space between the forward portion 18 and the forward roof section 17 for two occupants to sleep forwardly. In effect, this disposition takes special advantage of the top of the cabin, in combination with the fact that the roof section 16 has to extend to some height above the floor 44 to provide headroom, and by providing the forward compartment 17, converts a conventional two sleeper camper into a four sleeper camper.

Referring now to FIGS. 9–13, inclusive, the forward roof section 19, shown in FIG. 9, is raised above the forward sleeper lower section 18, which is cantilevered forward from the supporting lower section 15, and thus provides the lower enclosure or curtain wall of the forward camper unit.

The panel structure includes a quilted outer shell 105, wall padding 106 upwardly thereof, and an inner shell or panelling 107 with spaced apart fastening or retaining strips 108 being provided as shown in FIG. 9 and 10 to hold the panel assembly 31 in position. In this case the strips 108 are connected upwardly by suitable screws 109 into the under part of the forward roof section 19 and downwardly suitable screws 110 connect the strips 108 into the curtain wall or lower section forward part 18. Snap fasteners and numerous other devices of retaining the panels in place may be employed.

As shown in FIGS. 11–14, inclusive, the forward camper unit or compartment 17 may be enclosed by an alternate form of panel assembly 31a, which is of the accordion type, so that it does not have to be taken out of some convenient storage place and installed each time the camper is raised or disconnected and stored away each time the camper is to be lowered. Rather the panelling 31a may be permanently installed as indicated in FIG. 13 in which case a quilted padding 106a is provided outwardly, with accordion type inner shell or panelling 107a inwardly thereof. Such panelling 107a is indicated as being of conventional design with hinge parts 111 being provided to connect adjacent, parallel extending, accordion strips 112.

Also, inwardly of the shell 107a, retainer elements 108a of substantial rigidity are also designed to be accordioned, and as shown in FIG. 13, such strips are connected upwardly by screws 109 into the forward roof section 19 and downwardly by screws 110 into the curtain wall or forward compartment lower section 18. In this type of construction the window 112a, as shown in FIG. 12, and an opposite window, not shown, and also forward windows 113 are shown provided of a transparent foldable plastic which is of sufficient flexibility and resilience that it may follow the accordioning of the panel assembly 31a in which it is installed, without being cracked or broken when the forward roof section 19 is lowered.

As shown in FIG. 14, the panelling may be held in both raised and lowered positions by springs 119 which bear upwardly against the undersurface of the forward roof section 19 and which bear downwardly upon the inner shell 108b which holds the outer part or panelling 106b in position.

The camper 14 is designed with an upper section 16 that may be lowered when the vehicle 10 is travelling, thereby to reduce wind resistance and road sway, whereas when at a campsite the upper or roof section 16 may be raised to gain headroom so that the rear compartment 20 may be used as a camper, and to provide an accessible forward compartment 17, usable as the second two-sleeper unit, as aforesaid.

The use of hydraulic jacks 72a, 72b, 72c, 72d, regulated by individual control valves 95, permits the roof section 16 to be raised or lowered uniformly even if the vehicle 10 may be in a canted position, as on a hillside, or even if factors, such as wind pressure, might be operating to shift the load of, and to oppose the even lifting of, the roof section.

As shown in FIG. 3, the placing of the rear jacks 72a, 72c in location as shown, and thus at a distance forward of the rear corners of the lower section 15, permits the balancing of the roof section load even when accessories may be added to the roof section, such as awnings, a stove hood, cabinets, towel racks, speakers and the like.

The hydraulic system 43, which operates the jacks, is designed to permit flexibility in that a separate valve 95 is provided in the line to each jack cylinder whereas the valve 96 permits the reservoir 83 to become accessible for the return of the lifting fluid, when such may be desired.

Also, as aforesaid, the provision of pins 102 permits the load of the upper section to be relieved from the fluid system and transferred to the cylinders 77a, 77b, 77c, 77d whereby the cylinders are thus converted to serve as structural members which support the roof section. In this regard, it is pointed out that the roof section may be raised selectively to various elevations above the lower section 15, one way by which this may be accomplished being the provision of holes through the piston rods, at vertically spaced apart elevations, as indicated by the additional hole 101a in the piston rod 79b shown in dotted lines in FIG. 6.

Also, it should be noted that the floor section 44 of the lower section 15 is flanked by offset ledges 44a and 44b which extend outwardly over the vehicle rear wheels, and provide the parts of the lower section floor on which the jacks actually rest, as best seen in FIG. 5. Thus, the jacks are properly supported and the weight of the roof section 16 does not have to be carried by sides which extend upwardly from the truck bed 12, as in the case of other types of campers on the market which stress this feature.

The provision of interlocking, relatively, intertelescoping guideways 36 shown in FIGS. 2 and 5, and in detail cross-section in FIG. 4, provides additional means to refine the intersliding engagement of the respective upper and lower sections 16, 15.

Also, as additional features, the provision of the sliding seal members 81, 82 on the respective roof and floor sections 16, 15, seals the interior of the camper 14, as from weather and to prevent the entry of foreign matter, as blown dirt or sand.

In the embodiment of panelling 31 shown in FIGS. 2, 3, 9 and 10, the windows 31a, 31b, 31c comprise valued improvements that may be stored separately when the roof section has been lowered, and zippered into position by zippers, not shown, when the upper roof section 16, including the forward upper section 19, may be raised. Also advantage resides in that the quilted material 106 of the panelling insulates the forward compartment 19 in cold weather.

Since the floor section 15, which supports the roof section 16, rests upon the truck bed 12, it can be engaged by ground jacks and its weight transferred to be supported thereby, thus making it possible for the truck or vehicle 10 to be driven away, leaving the camper 14 to be used independently at campsite.

Also, a sliding window, not shown in the drawings, may be provided between the rear of the cabin 11 and the front of the camper compartment 20 to permit forward observation and communication, and also to permit items to be passed through such window.

The flexible cables from sources of electrical power, not shown, may carry electrical service to electrical outlets in both the roof section 16 and floor section 15. Also, the floor tank 55, as aforesaid, constitutes a reservoir within and beneath the base 50, for the storage of water forward of the rear end of the vehicle and thus in position not to overload the camper aft of the rear axle axis of the vehicle.

Also, the upright walls 115a and 115b, which support the ledges or raised floor sections 44a, 44b, respectively, comprise strength members in addition to their functions as ledge supports, and, as a consequence, strengthen the floor 44, and assist in positively disposing it on the bed 12.

Also, as aforesaid, the lower section windows 30 are aligned with the upper section windows 21a to permit light to enter the camper in both raised and lowered positions of the roof section 16.

The overhang or weather cowl 23 shown in FIG. 1 provides a small awning which may house an outside light. Also, as a weather cowl, it prevents rain from entering the space between the door 37 and the rear side of the roof section in FIG. 5. Also, it prevents rains from entering between the doors 37, 38 as they occupy the position shown in FIG. 4 when the roof section 16 is lowered.

Also, as aforesaid, the provision of the lips or forward shoulder strips 33a, 33b on the roof section 16, restrains and guides the roof section 16 to move slidably up and down the floor section 15 and thus prevents the roof section 16 from slipping rearwardly.

As an additional feature, it should be noticed that the panel shells or forms 107, 107a in the views of FIG. 10 and FIG. 13 include upper flanges 116a, 116b which extend under the roof section 19 thereby sealing against rain and wind beating, especially in transit, during bad weather.

Also, as additional features, not shown in FIG. 5, hardwood runners may be attached to the underside of the floor section 44 whereby to prevent wear and damage to the floor 44 in service, and when being disposed in position, as by skidding the camper on and off the vehicle when jacks or other devices might not be available, and also to prevent water from saturating or waterlogging the floor 44 in wet weather.

Also, the door latch 117b of the inner door 38 is shown in such an elevation in FIG. 5 that it is occluded by the outer door 37 when the roof section 16 is lowered, so that the inner door cannot be unlatched while the outer door is closed. Thus, the outer door latch 117a may be locked, thereby occluding the inner door 117b from being accessible for entry therethrough.

In summary, the camper provided by this invention includes a considerable number of improvements and special features which places it high in the class of improved campers. Especially, the invention provides a four sleeper camper which travels with roof section in lowered position to profit by the advantages thus attained in which is readily adaptable at campsite to have the roof section raised so that full camper benefits are thus obtained.

Also, the camper may be readily transferred to ground jack support so that the vehicle may be used separately. Also, the camper may be unloaded and stored within the headroom of an ordinary residential garage or car port.

The benefits obtained can be arrived at by other structures than those specifically shown in the drawings, and the invention thus considers other structures and arrangements of other parts and accessories as long as such may fall within the broad spirit of the invention and within the broad scope of interpretation claimed for and merited by the appended claims.

What is claimed is:

1. A four sleeper camper for removable positioning on a truck which comprises a chassis including a driver's cab and a truck bed rearwardly thereof, the camper comprising a lower section supporting a two sleeper camping unit and an upper section telescoped thereon, said lower section being supported on the truck bed and being of greater width than the driver's cab to provide on each side a forward stop shoulder, said upper section being vertically slidable over a lower section portion which is of substantially truck bed length and width, said upper section including on each side a forward, transverse member to telescope over a respective forward shoulder outwardly of said driver's cab, means for telescoping the sections, and guide means cooperatively provided by said upper and lower sections to guide the movement of the upper section upon the lower section, said lower section including a forward cantilever portion cantilevered over the top of said cab, said upper section also including a forward cantilever portion cantilevered above said lower section forward cantilever portion, and said camper providing enclosing means positionable between said upper cantilever portion and said forward lower cantilever portion to complete a forward enclosed two sleeper compartment when said upper section is raised.

2. A four sleeper camper as claimed in claim 1 in which said lower section includes a floor which rests upon said truck bed and also includes offset side ledges on each side of said floor and spaced above the sides of the truck bed and the rear wheels of the truck, and in which said ledges comprise the support for said means for telescoping said sections.

3. A four sleeper camper as claimed in claim 1 in which said lower section includes an inwardly swinging, full length, inner door in its rear wall, with door latch disposed near the top thereof, and in which said upper section includes a latchable, outwardly swinging, outer door of less than upper section height in its rear wall, whereby in lowered position said outer door occludes said inner door, including its door latch.

4. A four sleeper camper as claimed in claim 1 in which said lower section includes a stove, sink, refrigerator and toilet arranged on opposed sides of the space to the rear of the said two sleeper camping unit therein.

5. A four sleeper camper unit, as claimed in claim 1 in which said upper section is of width and length to telescope with slight clearance over said lower section.

6. A four sleeper camper unit as claimed in claim 5, in which said sections complementally provide interlocking, vertically extending guideways on sides and rear to insure proper intertelescoping of said sections without side play or rear slippage.

7. A four sleeper camper unit as claimed in claim 1 in which the rear two sleeper unit comprises, as support means, two opposed seats and a table selectively positionable to serve as a camper table and as a sleeper central support when said seats serve as head and foot supports for said rear sleeper unit.

8. A four sleeper camper as claimed in claim 1 in which a water reservoir is provided in said lower section including inlet thereinto through a side wall of said lower section, and having a hinged lid, and in which said upper section lower edge is slotted to bear upon said hinged lid when said upper section is in lowered position, thereby to keep said hinged lid disposed over said inlet until said upper section may be raised.

9. A four sleeper camper as claimed in claim 1 in which said enclosing means includes windows zippered thereinto when said upper section is raised.

10. A four sleeper camper as claimed in claim 1 in which said enclosing means is connected upwardly to said upper section forward cantilever portion and downwardly to said lower section forward cantilever portion, and in which said enclosing means is comprised of horizontally hinged, accordion panels, whereby said upper section lifts and folds said panel means as said upper section is respectively raised and lowered.

11. A four sleeper camper as claimed in claim 1 in which said telescoping means includes four piston and cylinder combinations, two supported from the opposed forward corners of said lower section and two supported from opposite sides of the lower section forwardly of the rear corners thereof, according to the weight distribution of said upper section.

12. A four sleeper camper for removable positioning on a truck which comprises a chassis including a driver's cab and a truck bed rearwardly thereof, the camper comprising a lower section supporting a two sleeper camping unit and an upper section telescoped thereon, said lower section being supported on the truck bed and said upper section being vertically slidable over a lower section portion which is of substantially truck bed length and width, hydraulic means for telescoping the sections including a pump in the lower camper section and piston and cylinder combinations above the truck bed and disposed symmetrically with regard to the weight distribution of the upper section, fluid lines connecting the pump and cylinders for simpultaneous operation to raise and lower said upper section, and guide means cooperatively provided by said upper and lower sections to guide the movement of the upper section upon the lower section, said lower section including a forward cantilever portion cantilevered over the top of said cab, said upper section also including a forward cantilever portion cantilevered above said lower section forward cantilever portion, and said camper providing panel means disposable between said upper cantilever portion and said lower cantilever portion to complete a forward enclosed two sleeper compartment when said upper section is raised, said lower section providing a water reservoir including inlet thereinto through a side wall of said lower section, said inlet having a hinged lid, and said upper section lower edge being slotted to bear upon said hinged lid when said upper section is in lowered position, thereby to keep said hinged lid disposed over said inlet until said upper section may be raised.

References Cited

UNITED STATES PATENTS

| | | | |
|---|---|---|---|
| 2,811,725 | 11/1957 | Cence | 296—23 X |
| 2,879,103 | 3/1959 | Hall | 296—23 |
| 3,050,331 | 8/1962 | Mansen | 296—23 X |
| 3,145,046 | 8/1964 | Orn | 296—23 |
| 3,160,435 | 12/1964 | Smith | 296—23 |
| 3,165,350 | 1/1965 | Willson | 296—23 |
| 3,190,689 | 6/1965 | Calthorpe | 296—23 |

FOREIGN PATENTS 1,314,584  12/1962  France.

BENJAMIN HERSH, *Primary Examiner.*

PHILIP GOODMAN, *Examiner.*